(12) United States Patent  
Hickman et al.

(10) Patent No.: US 8,497,859 B1  
(45) Date of Patent: Jul. 30, 2013

(54) DISPLAY OF INFORMATION ON OR WITHIN A THREE-DIMENSIONAL IMAGE

(75) Inventors: Ryan Hickman, Mountain View, CA (US); Thor Lewis, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/617,612

(22) Filed: Sep. 14, 2012

Related U.S. Application Data

(60) Provisional application No. 61/619,463, filed on Apr. 3, 2012.

(51) Int. Cl.
  *G06T 15/00* (2011.01)
  *G09G 5/00* (2006.01)

(52) U.S. Cl.
  USPC .......................................... 345/419; 345/630

(58) Field of Classification Search
  None
  See application file for complete search history.

(56) References Cited

U.S. PATENT DOCUMENTS

| | | | |
|---|---|---|---|
| 7,168,051 B2 | 1/2007 | Robinson et al. | |
| 7,739,221 B2 * | 6/2010 | Lawler et al. | 707/770 |
| 2005/0253840 A1 * | 11/2005 | Kwon | 345/419 |
| 2006/0036577 A1 * | 2/2006 | Knighton et al. | 707/3 |
| 2009/0096790 A1 * | 4/2009 | Wiedemann et al. | 345/427 |
| 2009/0276316 A1 | 11/2009 | Verma et al. | |
| 2011/0106631 A1 | 5/2011 | Lieberman et al. | |
| 2011/0213655 A1 * | 9/2011 | Henkin et al. | 705/14.49 |

OTHER PUBLICATIONS

T. Funkhouser, P. Min, M. Kazhdan, J. Chen, A. Halderman, D. Dobkin; A Search Engine for 3D Models; ACM Transactions on Graphics, vol. 22, No. 1; Jan. 2003.*

* cited by examiner

*Primary Examiner* — Carlos Perromat

(74) *Attorney, Agent, or Firm* — McDonnell Boehnen Hulbert & Berghoff LLP

(57) ABSTRACT

Methods and systems for displaying information on or within a three-dimensional (3D) image are described. In an example, a computing device may be configured to determine, based on a two-dimensional (2D) content displayed on a display device, an object depicted in the 2D content. The computing device may be configured to receive information indicative of a request to initiate a three-dimensional (3D) image viewer to view the object in the 3D image viewer. The computing device, accordingly, may be configured to provide rendering information associated with instructions for rendering in the 3D image viewer a 3D image representing a 3D object data model of the object on the display device. The computing device may be configured to provide, in the 3D image viewer, information relating to the object and including at least a portion of the 2D content.

20 Claims, 10 Drawing Sheets

COMPUTER PROGRAM PRODUCT 600

SIGNAL BEARING MEDIUM 601

PROGRAM INSTRUCTIONS 602

- DETERMINING, BASED ON CONTENT OF A TWO-DIMENSIONAL (2D) ADVERTISEMENT, AN OBJECT BEING ADVERTISED IN THE 2D ADVERTISEMENT

- RECEIVING INFORMATION INDICATIVE OF A REQUEST TO INITIATE A THREE-DIMENSIONAL (3D) IMAGE VIEWER TO VIEW THE OBJECT IN THE 3D IMAGE VIEWER

- PROVIDING, BASED ON THE INFORMATION INDICATIVE OF THE REQUEST, RENDERING INFORMATION ASSOCIATED WITH INSTRUCTIONS FOR RENDERING IN THE 3D IMAGE VIEWER A 3D IMAGE REPRESENTING A 3D OBJECT DATA MODEL OF THE OBJECT, BASED ON ONE OR MORE ATTRIBUTES OF THE OBJECT AS ADVERTISED IN THE 2D ADVERTISEMENT INCLUDING COLOR OF THE OBJECT, SIZE OF THE OBJECT, POSITION OF THE OBJECT, AND VIEW OF THE OBJECT IN THE 2D ADVERTISEMENT

- PROVIDING, IN THE 3D IMAGE VIEWER, ADVERTISING INFORMATION RELATING TO THE OBJECT AND INCLUDING AT LEAST A PORTION OF THE CONTENT OF THE 2D ADVERTISEMENT

| COMPUTER READABLE MEDIUM 603 | COMPUTER RECORDABLE MEDIUM 604 | COMMUNICATIONS MEDIUM 605 |

FIGURE 6

DISPLAY OF INFORMATION ON OR WITHIN A THREE-DIMENSIONAL IMAGE

CROSS REFERENCE TO RELATED APPLICATION

The present application claims priority to U.S. Provisional patent application Ser. No. 61/619,463, filed on Apr. 3, 2012, and entitled "Display of an Advertisement on or within a Three-Dimensional Image," which is herein incorporated by reference as if fully set forth in this description.

BACKGROUND

In computer graphics, three-dimensional (3D) modeling involves generation of a representation of a 3D surface of an object. The representation may be referred to as a 3D object data model, and can be rendered or displayed as a two-dimensional image via 3D rendering or displayed as a 3D image. 3D object data models represent a 3D object using a collection of points in 3D space, connected by various geometric entities such as triangles, lines, curved surfaces, etc. Various techniques exist for generating 3D object data models utilizing point clouds and geometric shapes, for examples.

Being a collection of data, 3D models can be created by hand, algorithmically, or objects can be scanned, for example. As an example, an artist may manually generate a 3D image of an object that can be used as the 3D model. As another example, a given object may be scanned from a number of different angles, and the scanned images can be combined to generate the 3D image of the object. As still another example, an image of an object may be used to generate a point cloud that can be algorithmically processed to generate the 3D image.

3D object data models may include solid models that define a volume of the object, or may include shell or boundary models that represent a surface (e.g. the boundary) of the object. Because an appearance of an object depends largely on an exterior of the object, boundary representations are common in computer graphics.

3D models are used in a wide variety of fields, and may be displayed using a number of different types of interfaces. Example interfaces may provide functionality to enable interaction between a user and the 3D models.

SUMMARY

The present application discloses systems and methods for displaying information on or within a three-dimensional (3D) image. In one aspect, a method is described. The method may comprise determining, based on content of a two-dimensional (2D) advertisement, an object being advertised in the 2D advertisement. The method may also comprise receiving information indicative of a request to initiate a three-dimensional (3D) image viewer to view the object in the 3D image viewer. The method may further comprise providing, based on the information indicative of the request, rendering information associated with instructions for rendering in the 3D image viewer a 3D image representing a 3D object data model of the object, based on one or more attributes of the object as advertised in the 2D advertisement including color of the object, size of the object, position of the object, and view of the object in the 2D advertisement. The method may also comprise providing, in the 3D image viewer, advertising information relating to the object and including at least a portion of the content of the 2D advertisement.

In another aspect, a non-transitory computer readable medium having stored thereon instructions executable by a computing device to cause the computing device to perform functions is described. The functions may comprise determining, based on content of a two-dimensional (2D) advertisement, an object being advertised in the 2D advertisement. The functions may also comprise receiving information indicative of a request to initiate a three-dimensional (3D) image viewer to view the object in the 3D image viewer. The functions may further comprise providing, based on the information indicative of the request, rendering information associated with instructions for rendering in the 3D image viewer a 3D image representing a 3D object data model of the object, based on one or more attributes of the object as advertised in the 2D advertisement including color of the object, size of the object, position of the object, and view of the object in the 2D advertisement. The functions may also comprise providing, in the 3D image viewer, advertising information relating to the object and including at least a portion of the content of the 2D advertisement.

In still another aspect, a system is described. The system may comprise a computing device. The system may also comprise a memory, the memory storing instructions executable by the computing device to cause the computing device to determine, based on a two-dimensional (2D) content, an object depicted in the 2D content. The instructions also may be executable by the computing device to cause the computing device to receive information indicative of a request to initiate a three-dimensional (3D) image viewer to view the object in the 3D image viewer. The instructions further may be executable by the computing device to cause the computing device to provide, based on the information indicative of the request, rendering information associated with instructions for rendering in the 3D image viewer a 3D image representing a 3D object data model of the object, based on one or more attributes of the object as depicted in the 2D content including color of the object, size of the object, position of the object, and view of the object in the 2D content. The instructions also may be executable by the computing device to cause the computing device to provide, in the 3D image viewer, information relating to the object and including at least a portion of the 2D content.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 6 is a schematic illustrating a conceptual partial view of an example computer program product that includes a computer program for executing a computer process on a computing device, arranged according to at least some embodiments presented herein.

DETAILED DESCRIPTION

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

In an example, a computing device may be configured to determine, based on a two-dimensional (2D) content displayed on a display device, an object depicted in the 2D content. The computing device may be configured to receive information indicative of a request to initiate a three-dimensional (3D) image viewer to view the object in the 3D image viewer. Based on the information indicative of the request, the computing device may be configured to provide rendering information associated with instructions for rendering in the 3D image viewer a 3D image representing a 3D object data model of the object on the display device. The computing device further may be configured to provide, in the 3D image viewer, information relating to the object and including at least a portion of the 2D content.

In one example, the computing device may be configured to provide the information associated with the instructions for rendering in the 3D image viewer the 3D image representing the 3D object data model of the object, in accordance with one or more attributes of the object as depicted in the 2D content including color of the object, size of the object, position of the object, and view of the object as depicted in the 2D content.

Figure 1:
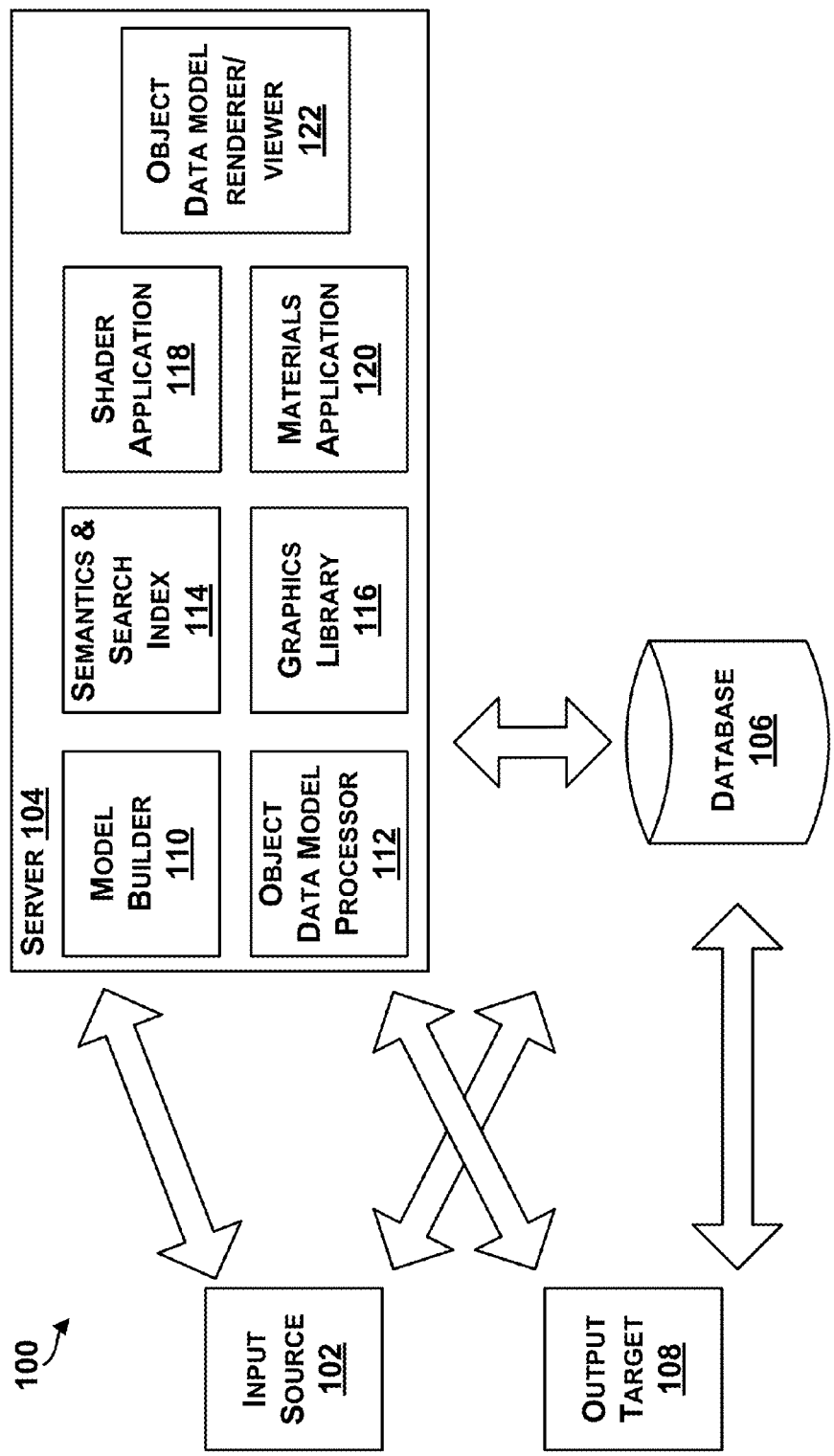
FIG. 1 illustrates an example system for object data modeling, in accordance with an embodiment.

Referring now to the figures, FIG. 1 illustrates an example system 100 for object data modeling, in accordance with an embodiment. The system 100 includes an input source 102 coupled to a server 104 and a database 106. The server 104 is also shown coupled to the database 106 and an output target 108. The system 100 may include more or fewer components, and each of the input source 102, the server 104, the database 106, and the output target 108 may comprise multiple elements as well, or each of the input source 102, the server 104, the database 106, and the output target 108 may be interconnected as well. Thus, one or more of the described functions of the system 100 may be divided up into additional functional or physical components, or combined into fewer functional or physical components. In some further examples, additional functional and/or physical components may be added to the examples illustrated by FIG. 1.

Components of the system 100 may be coupled to or configured to be capable of communicating via a network (not shown), such as a local area network (LAN), wide area network (WAN), wireless network (Wi-Fi), or Internet, for example. In addition, any of the components of the system 100 may be coupled to each other using wired or wireless communications. For example, communication links between the input source 102 and the server 104 may include wired connections, such as a serial or parallel bus, or wireless links, such as Bluetooth, IEEE 802.11 (IEEE 802.11 may refer to IEEE 802.11-2007, IEEE 802.11n-2009, or any other IEEE 802.11 revision), or other wireless based communication links.

The input source 102 may be any source from which a 3D object data model may be received. In some examples, 3D model acquisition (shape and appearance) may be achieved by working with venders or manufacturers to scan objects in 3D. For instance, structured light scanners may capture images of an object and a shape of the object may be recovered using monochrome stereo cameras and a pattern projector. In other examples, a high-resolution DSLR camera may be used to capture images for color texture information. In still other examples, a raw computer-aided drafting (CAD) set of drawings may be received for each object. Thus, the input source 102 may provide a 3D object data model, in various forms, to the server 104. As one example, multiple scans of an object may be processed into a merged mesh and assets data model, and provided to the server 104 in that form.

The server 104 includes a model builder 110, an object data model processor 112, a semantics and search index 114, and a graphics library 116, a shader application 118, a materials application 120, and an object data model virtual renderer/viewer 122. Any of the components of the server 104 may be coupled to each other. In addition, any components of the server 104 may alternatively be a separate component coupled to the server 104. The server 104 may further include a processor and memory including instructions executable by the processor to perform functions of the components of the server 104, for example.

The model builder 110 receives the mesh data set for each object from the input source 102, which may include a data set defining a dense surface mesh geometry, and may generate an animated model of the object in 3D. For example, the model builder 110 may perform coherent texture unwrapping from the mesh surface, and determine textures of surfaces emulated from the geometry.

The object data model processor 112 may also receive the mesh data set for each object from the input source 102 and generate display meshes. For instance, the scanned mesh images may be decimated (e.g., from 5 million to 120,000 surfaces) utilizing texture-preserving decimation. Texture map generation can also be performed to determine color texture for map rendering. Texture map generation may include using the mesh data sets H that have colors but no UV (coordinate system of a 2D texture space) unwrapping to generate a mesh D with UV unwrapping but no colors. As an example, for a single output texture pixel of an image processing may include, for a given point in UV determine a triangle in the mesh's UV mapping D, and using triangle-local coordinates, move to an associated 3D point on the mesh. A bidirectional ray may be cast along the triangle's normal to intersect with the mesh H, and color, normal and displacement may be used for an output. To generate an entire texture image, each pixel in the image can be processed.

In some examples, the model builder 110 or the object data model processor 112 may output a 3D object data model of an object that includes one file with a combination of all data needed to render a 3D image of the object. In other examples, the model builder 110 or the object data model processor 112 may output a 3D object data model in the form of multiple files so that the 3D object data model file is divided into smaller parts.

The semantics and search index 114 may receive captured images or processed images that have been decimated and compressed, and may perform texture resampling and also shape-based indexing. For example, for each object, the semantics and search index 114 may index or label components of the images (e.g., per pixel) as having a certain texture, color, shape, geometry, attribute, etc. The semantics and search index 114 may receive the 3D object data model file or the files comprising the 3D object data model from the model builder 110 or the object data model processor 112, and may be configured to label portions of the file or each file individually with identifiers related to attributes of the file.

In some examples, the semantics and search index 114 may be configured to provide annotations for aspects of the 3D object data models. For instance, an annotation may be provided to label or index aspects of color, texture, shape, appearance, description, function, etc., of an aspect of a 3D object data model. Annotations may be used to label any aspect of an image or 3D object data model, or to provide any type of information. Annotations may be performed manually or automatically. In examples herein, an annotated template of an object in a given classification or category may be generated that includes annotations, and the template may be applied to all objects in the given classification or category to apply the annotations to all objects.

The graphics library 116 may include a WebGL or OpenGL mesh compression to reduce a mesh file size, for example. The graphics library 116 may provide the 3D object data model in a form for display on a browser, for example. In some examples, a 3D object data model viewer may be used to display images of the 3D objects data models. The 3D object data model viewer may be implemented using WebGL within a web browser, or OpenGL, for example.

The shader application 118 may be configured to apply a shader to portions of the 3D object data model file or to files of the 3D object data model according to the indexes of the file (as labeled by the semantics and search index 114) to generate a 3D image. The shader application 118 may be executed to apply a shader from a number of shaders according to the indexes of the file. The shader may include information related to texture, color, appearance, etc., of a portion of the 3D image.

In one example, the shader application 118 may be executed to render an image with shading attributes as defined by indexes of the files. For example, objects with multiple surfaces may have different attributes for each surface, and the shader application 118 may be executed to render each surface accordingly.

The materials application 120 may be configured to apply a material to portions of the 3D object data model file or to files of the 3D object data model according to the indexes of the file (as labeled by the semantics and search index 114) to generate a 3D image. The materials application 120 may be executed to apply a material from a number of materials according to the indexes of the file. The materials application may apply any material, such as leather, metal, wood, etc., so as to render an appearance of a portion of the 3D image.

In one example, the materials application 120 may access a database that includes information regarding a number of reference materials (e.g., brass, fur, leather), and objects with multiple materials may be separated into distinct portions so that the materials application 120 can be executed to render the separate distinct portions. As an example, a hood on a car may include a hood ornament, and the hood may be painted and the ornament may be chrome. The materials application 120 and the shader application 118 can be executed to identify two separate materials and render each material with an appropriate shade.

The object data model renderer/viewer 122 may receive the 3D object data model file or files and execute the shader application 118 and the materials application 120 to render a 3D image.

The database 106 may store all data sets for a 3D object data model in any number of various forms from raw data captured to processed data for display.

The output target 108 may include a number of different targets, such as a webpage on the Internet, a search engine, a database, etc. The output target 108 may include a 3D object data model viewer that enables product advertisements or product searches based on the 3D object data model.

In examples herein, the system 100 may be used to acquire data of an object, process the data to generate a 3D object data model, and render the 3D object data model for display.

Figure 2:
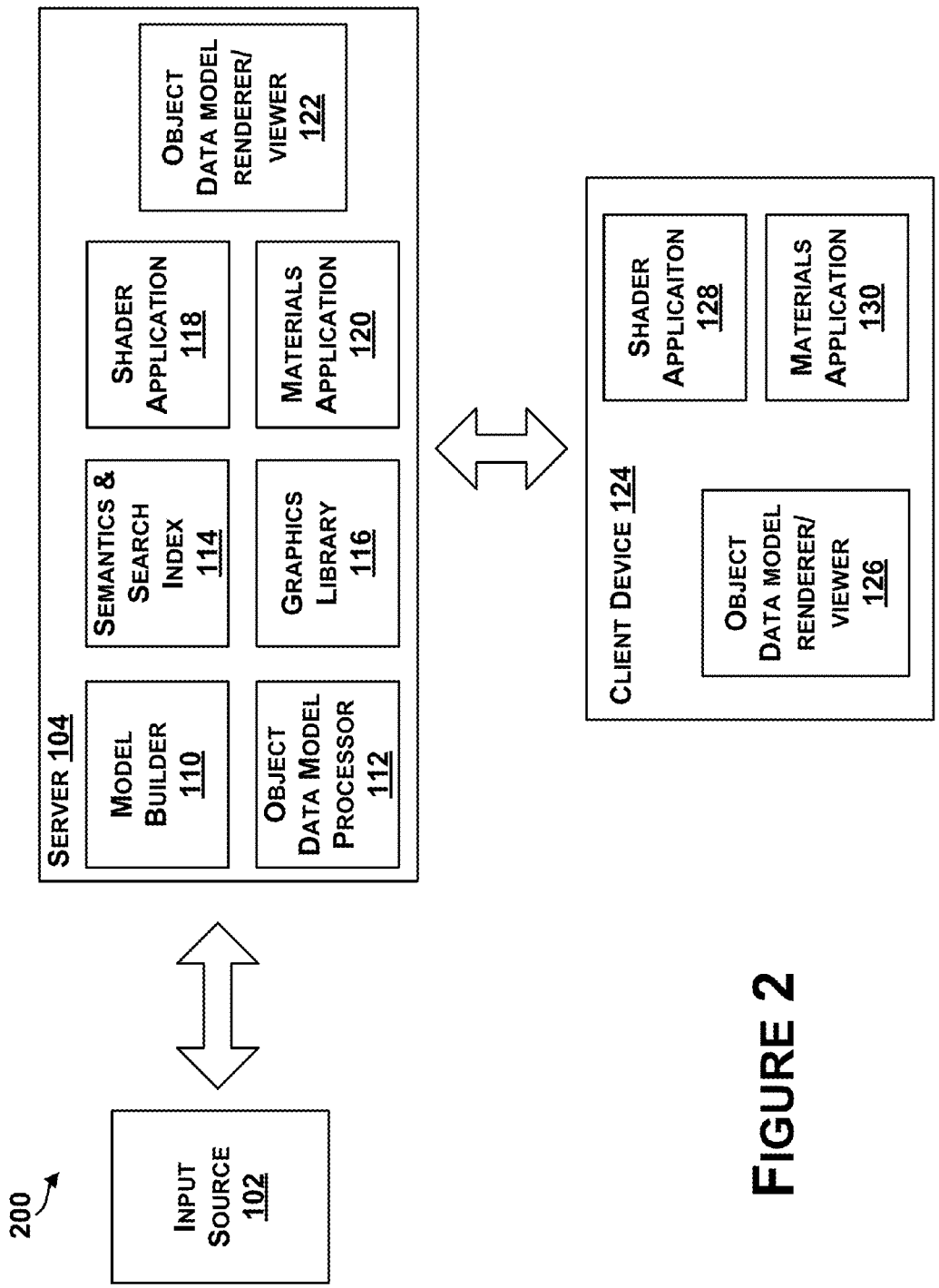
FIG. 2 illustrates another example system for object data modeling, in accordance with an embodiment.

FIG. 2 illustrates another example system 200 for object data modeling, in accordance with an embodiment. The system 200 includes the input source 102 coupled to the server 104, which is coupled to a client device 124. The input source 102 and the server 104 may be as described in FIG. 1. The client device 124 may receive outputs from any of the components of the server 124, and may be configured to render a 3D image.

The client device 124 includes an object data model renderer/viewer 126, a shader application 128, and a materials application 130. The object data model renderer/viewer 126, the shader application 128, and the materials application 130 may all be configured as described with respect to the object data model renderer/viewer 122, the materials application 120, and the shader application 118 of the server 104 as described with respect to FIG. 1.

In some examples, the client device 124 may receive the 3D object data model file or files from the server 104 and render a 3D image of the object by executing the shader application 128 and the materials application 130. When executing the shader application 128 and the materials application 130, the client device 124 may access separate databases to retrieve appropriate shader and material information to apply to the image, access the server 104 to receive appropriate shader and material information from the shader application 118 and the materials application 120, or may store information locally regarding the appropriate shader and material information to apply.

In some examples, the client device 124 may receive the 3D object data model file or files from the server 104 and render a 3D image of the object. In other examples, the server 104 may render a 3D image of the object and stream the 3D image to the client device 124 for display.

As described, in some examples, the 3D object data model may include various forms of data, such as raw image data captured, mesh data, processed data, etc. Data of the 3D object data model may be encoded and compressed so as to store information related to 3D geometry of an object associated with information related to appearance of the object for transmission and display within a web browser or application on a device.

In one example, data of the 3D object data model may be compressed by initially encoding a triangle mesh representing the 3D object as a list including a plurality of vertices and a plurality of indices. Each vertex in the list may have several arbitrary parameters associated with the vertex, including, but not limited to, position, surface normal, and texture coordinates. The triangle indices may be stored in a 16-bit unsigned integer format and vertex attributes may be stored in a 32-bit floating point format. The 32-bit floating point format vertex attributes may be reduced to 15-bits. In instances in which compressed data is for a version of a web browser or application that does not have the ability to decompress dictionary encoded data, a delta compression may be used to store differences between the triangle indices and vertex attributes, either in an array of structures layout or a transposed layout. After delta compression, post-delta data may be ZigZag encoded (e.g., using open-source Protocol Buffer library available from Google Inc.). Encoding may follow the format ZigZag(x): (x<<1)^(x>>15) with a corresponding decoding (during decompression) to follow the format UnZigZag(x): (x>>1)^(-(x & 1)). ZigZag encoding may be followed by multi-byte character encoding using UTF-8 encoding. Finally, the UTF-8 encoded data may be compressed using GNU Gzip or bzip2 to generate a compressed 3D object data model file.

The compressed copy of the 3D object data model file may be stored in a database, such as the database 106 in FIG. 1, in the server 104, or on the client device 124, for example. In some examples, the compressed 3D object data model file may be provided by the server 104 to the client device 124 in response to a request from the client device 124. If using a web browser to view the 3D object data model file, the client device 124 may decompress the compressed 3D object data model file according to Java instructions provided in the object browser web page. A local copy of the object browser web page and a local copy of the uncompressed, searchable data of the 3D object data model file can be stored in local memory of the client device 124. The client device 124 may display exemplary screenshots of an initial default view of a 3D object, based on the searchable data of the 3D object data model file loaded in the web browser.

In some examples, the 3D object data file includes information as to geometry of an object sorted by material and divided into portions to be loaded as fragments and reassembled in portions by the client device. As one example, for a mobile phone comprising multiple parts, each part may be rendered using a separate or distinct shader for each material. Thus, the 3D object data file may be divided into multiple portions and compressed as described above to retain all portions. The client device may receive the compressed 3D object data file, decompress the file, and reassemble the portions of the object one-by-one by loading each fragment of the file, streaming file requests for each shader, and reassembling an image of the object.

Figure 3:
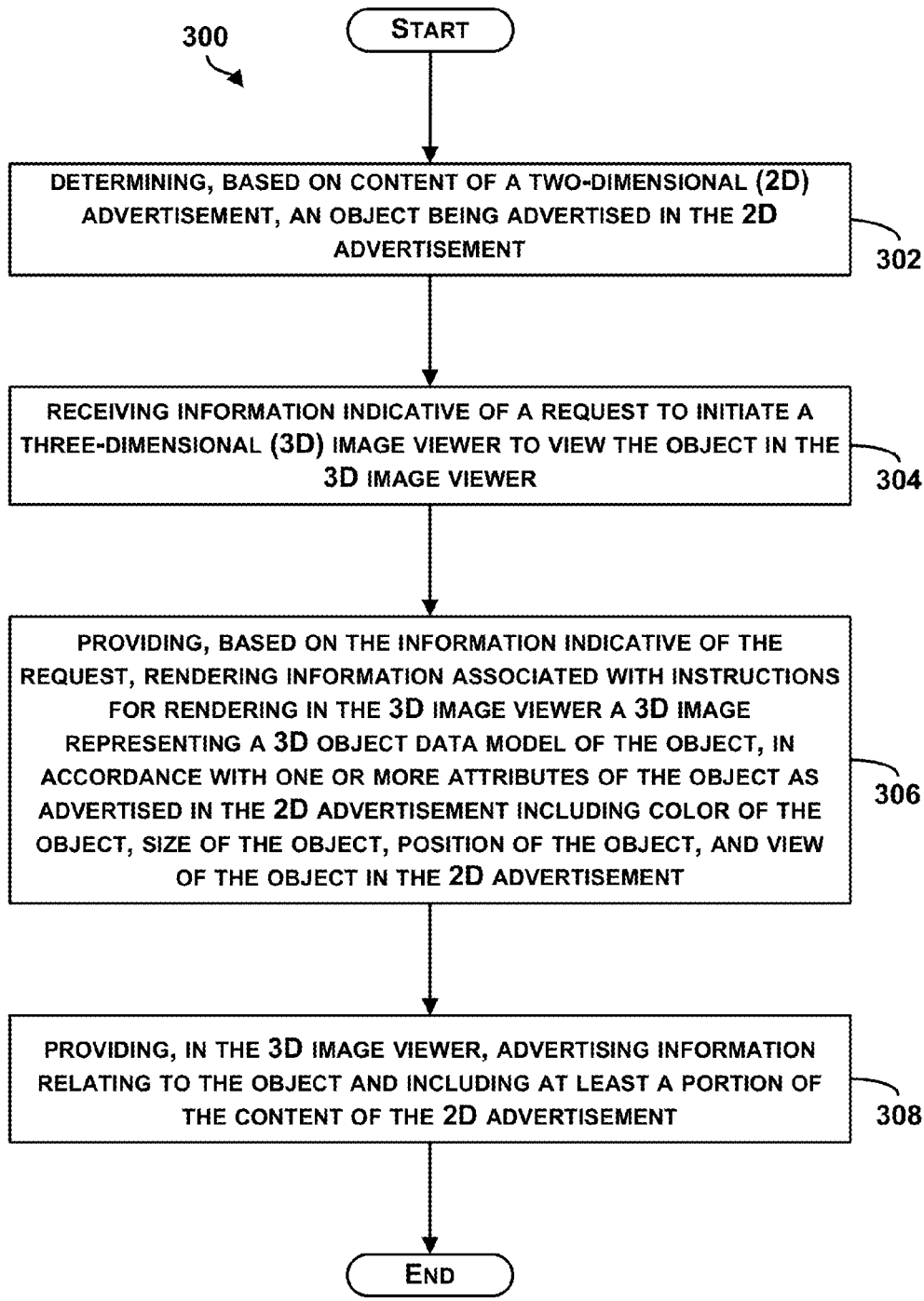
FIG. 3 illustrates a flowchart of an example method to display information on a three-dimensional (3D) image of an object, in accordance with an embodiment.

As described above, the systems 100 or 200 may be used to acquire data of an object, process the data to generate a 3D object data model, and render the 3D object data model for display. FIG. 3 illustrates a flowchart of an example method 300 to display information on a 3D image of an object, in accordance with an embodiment. The method 300 shown in FIG. 3 presents an embodiment of a method that could be used by the systems 100 or 200 of FIGS. 1-2, for example.

The method 300 may include one or more operations, functions, or actions as illustrated by one or more of blocks 302-308. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 300 and other processes and methods disclosed herein, the flowchart shows functionality and operation of one possible implementation of present examples. In this regard, each block may represent a module, a segment, or a portion of program code, which includes one or more instructions executable by a processor for implementing specific logical functions or steps in the process. The program code may be stored on any type of computer readable medium or memory, for example, such as a storage device including a disk or hard drive. The computer readable medium may include a non-transitory computer readable medium or memory, for example, such as computer-readable media that stores data for short periods of time like register memory, processor cache and Random Access Memory (RAM). The computer readable medium may also include non-transitory media or memory, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the method 300 and other processes and methods disclosed herein, each block in FIG. 3 may represent circuitry that is wired to perform the specific logical functions in the process.

The method 300 is described in the context of advertisements for illustration; however, the method 300 can be used generally with any displayed content.

At block 302, the method 300 includes determining, based on content of a two-dimensional (2D) advertisement, an object being advertised in the 2D advertisement. A search engine may receive a search query by way of a webpage and the search engine, accordingly, may be configured to generate search results based on the search query and may also be configured to generate advertisements based on the search query. The advertisements may, as an example, include a two-dimensional (2D) advertisement associated with a product or a service being advertised. In examples, the 2D advertisement may include one or more of a pop-up advertisement, a pop-under advertisement, an audio stream, or a video feed.

The webpage, the search results, and the 2D advertisement may be displayed on a client device (a mobile telephone, personal digital assistant (PDA), laptop, notebook, or netbook computer, tablet computing device, a wearable computing device, etc.). A computing device (e.g., a server such as the server 104 in FIG. 1) in communication with the client device, may be configured to determine, based on content of the 2D advertisement, an object being advertised (e.g., the product or the service being advertised). For example, the computing device may be configured to determine one or more keywords in the content that are indicative of the object (e.g., a keyword "shoe" may be indicative of a shoe that is being advertised in the 2D advertisement). The one or more keywords may be included in a text, an image, an audio stream, or a video feed included in the content of 2D the advertisement, for example.

As an example, the content of the 2D advertisement may include an image relating to the object being advertised (e.g., the image may include a picture of the object). The computing device, using image recognition techniques known in the art, may be configured to determine or identify a given content in the image (e.g., determine or identify the object being advertised in the 2D advertisement). In one example, the 2D advertisement may include a video feed, and the image relating to the object may be extracted from the video feed.

Figure 4A:
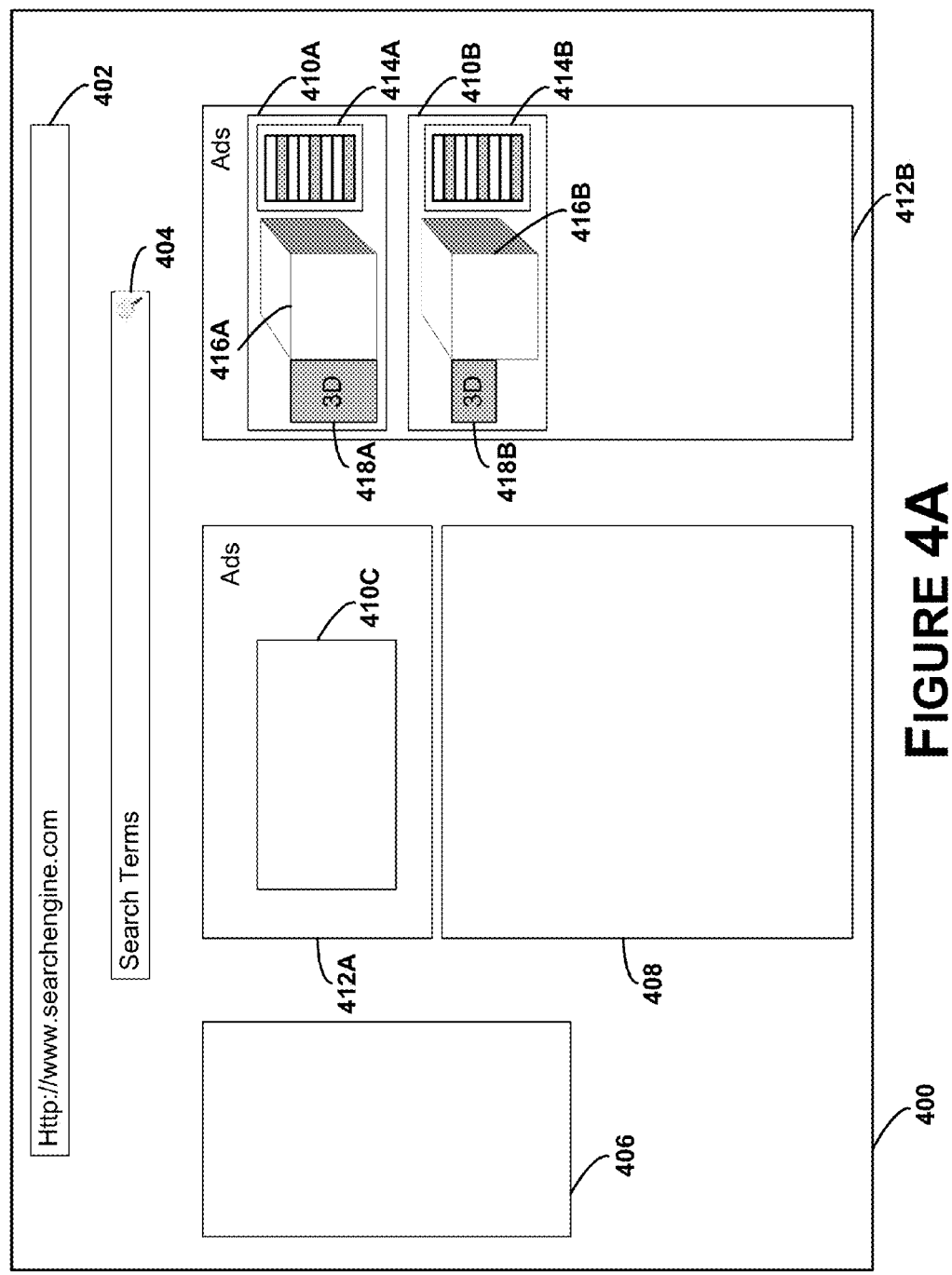
FIG. 4A illustrates an example webpage layout, in accordance with an embodiment.

FIG. 4A illustrates an example webpage layout, in accordance with an embodiment. The webpage 400 may include an address bar 402 to receive an Internet address of the search engine. The search engine may be configured to receive, through network communication (e.g., the internet) a search term or search query input by way of a search terms input box 404, for example. The webpage 400 may include miscellaneous information and search functionalities 406, for example. The search engine may be configured to conduct a search on the World Wide Web based on the search query input in the search terms input box 404, and accordingly the webpage 400 may be configured to display search results 408, and 2D advertisements 410A, 410B, and 410C in advertising areas 412A-B, for example. Two 2D advertisements 410A-B are shown in the advertising area 412B and one 2D advertisement is shown in the advertising area 412A for illustration only. More or less advertisements can be shown. Also, this webpage layout is for illustration only, other layouts are possible.

The 2D advertisements 410A, 410B, and 410C displayed in the advertising areas 412A-B may be relevant to the search terms used to conduct the search. For example, if a search term used is a "shoe", the 2D advertisements 410A, 410B, and 410C may be advertising shoes. The 2D advertisements 410A, 410B, and 410C may include text relating to an object being advertised and/or an image relating to or of the object being advertised. For example, the 2D advertisement 410A may include text 414A and image 416A of a respective object being advertised. Similarly, the 2D advertisement 410B may include text 414B and image 416B of another respective object being advertised. In an example, the computing device may be configured to determine or identify the object being advertised based on identifying keywords in the text (e.g., the text 414A-B) or recognizing features of the image (e.g., the images 416A-B) in the 2D advertisement. In examples, the 2D advertisements 410A, 410B, and 410C may include an audio stream or a video feed associated with the object being advertised. In these examples, the computing device may be configured to identify keywords in the audio stream or video feed, in addition to features of images extracted from the video feed, for example. For illustration purposes herein, the images 416A-B may be considered images of the respective objects being advertised.

Referring back to FIG. 3, at block 304, the method 300 includes receiving information indicative of a request to initiate a 3D image viewer to view the object in the 3D image viewer. The advertisements (e.g., the 2D advertisements 410A, 410B, and 410C) may include a user-selectable space that, when selected, a 3D image viewer may be initiated to view the object being advertised in the 3D image viewer. The 3D image viewer may be launched or initiated on the client device, and the computing device (e.g., server) in communication with the client device may also receive information indicating the request.

In FIG. 4A, for example, rectangular boxes 418A-B labeled "3D" are attached to the images 416A-B. The computing device may be configured to receive the request when a user clicks on the boxes 418A-B (e.g., by way of a mouse arrow or cursor), for example. In another example, the 2D advertisements 410A, 410B, and 410C may be selectable by the user clicking anywhere on the 2D advertisements 410A, 410B, and 410C. In other examples, hovering over a given area of the 2D advertisements 410A, 410B, and 410C with a mouse arrow or reticle may initiate the request. Other shapes and arrangements are possible to provide a mechanism for the computing device to receive the request.

Referring back to FIG. 3, at block 306, the method 300 includes providing, based on the information indicative of the request, rendering information associated with instructions for rendering in the 3D image viewer a 3D image representing a 3D object data model of the object, in accordance with one or more attributes of the object as advertised in the 2D advertisement including color of the object, size of the object, position of the object, and view of the object as advertised in the 2D advertisement. Based on the information indicative of the request to initiate of the 3D image viewer, the computing device may be configured to provide instructions to render the 3D image in the 3D image viewer. In an example, the 3D image viewer may be embedded within a webpage (e.g., the webpage 400 in FIG. 4A). The webpage, thus, may include executable instructions identifying the 3D image viewer to be embedded within the webpage.

For example, the computing device may be configured to serve a rendered 3D image and/or instructions for rendering a 3D image using graphics software such as WebGL, OpenGL ES, etc., to the webpage. In one example, WebGL may be used to render the 3D image within the 3D image viewer (that may be embedded in the webpage) based on information received from the computing device.

In some examples, the 3D image viewer may be embedded directly within the webpage with JavaScript or other scripting languages. For example, JavaScript may be used to render an iframe (or inline frame). In other examples, the 3D image viewer may be included within the webpage by pasting a block or section of HTML into code for the webpage. The block of HTML may describe information associated with parameters for customizing the display of the 3D image viewer. For instance, the block of HTML may identify a 3D object data model of the object advertised in the 2D advertisement.

In an example, the computing device may be configured to define parameters for customizing the 3D image viewer (e.g., size, background, user interface options, etc.) as well as parameters for customizing/controlling a rendering of the 3D object data model within the 3D image viewer (e.g., size, animation, camera angle, orientation, zoom level, color, texture, shading, overlays, etc.).

In one example, the 3D image viewer may be launched or initiated in a window that pops-up from the webpage. In other examples, the 3D image viewer is not launched in a separate window, but may be initiated within the webpage. Other arrangements are possible.

Figure 4B:
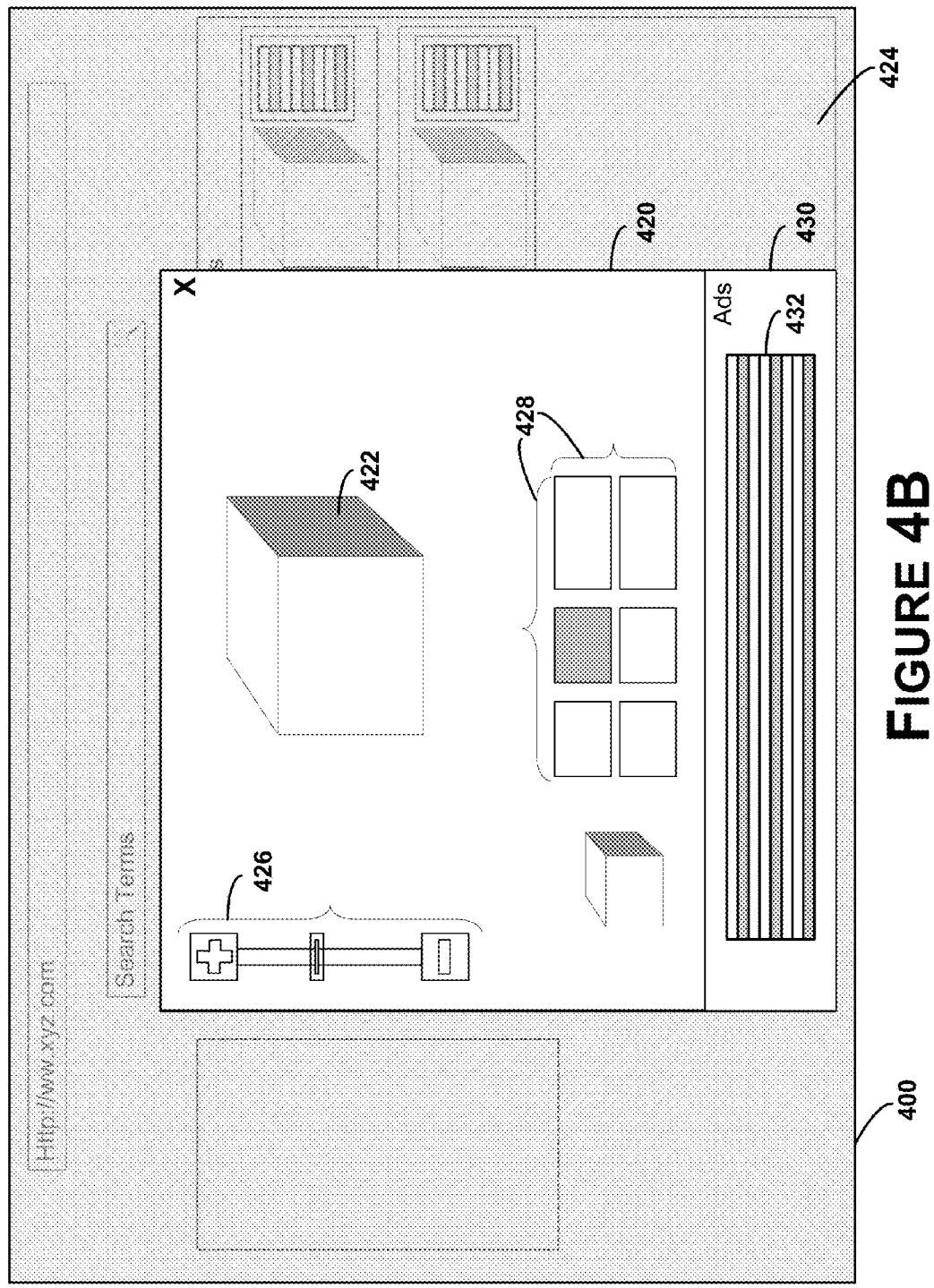
FIG. 4B illustrates an example 3D image viewer, in accordance with an embodiment.

FIG. 4B illustrates an example 3D image viewer 420, in accordance with an embodiment. In FIG. 4B, the 3D image viewer 420 is initiated in a separate window that pops-up from the webpage 400, for illustration only. In other examples, the 3D image viewer 420 may be embedded within the webpage 400 and not in a separate window. For example, the webpage 400 may include an article about equipment X. A user may click on an icon on an inactive 3D image viewer (e.g., the 3D image viewer 420) embedded in the article to activate 3D image viewer.

In an example, the computing device may be configured to cause the 3D image viewer 420 to be initiated upon receiving the information indicative of the request by way of a click on the box 418A, for example. In this example, the 3D image viewer may be configured to display a 3D image 422 representing a 3D object data model of the object being advertised in the 2D advertisement 410A.

In an example, contents of the webpage 400 may be obscured, excluding the pop-up window including the 3D image viewer 420, by providing a semi-transparent graphic 424 overlaid onto the contents of the webpage 400 as shown in FIG. 4B. Other display arrangements may be implemented as well to provide visual contrast between the 3D image viewer 420 and other content of the webpage 400. In other examples, the content of the webpage 400 may not be obscured and may not be visually contrasted to the 3D image viewer 420.

The computing device may be configured to determine or identify attributes of the object being advertised in the 2D advertisement 410A. For example, the computing device may be configured to determine a color, a material, a size, a position, and a view of the object being advertised in the 2D advertisement 410A by recognizing keywords in the text 414A or by recognizing features of the image 416A of the object being advertised. As an example, the text 414A in FIG. 4A may include "shoe x in black and made of leather." Accordingly, the computing device may be configured to render, in the 3D image viewer 420 the 3D image 422 as a black shoe made of leather representing the 3D object data model of the shoe x being advertised in the 2D advertisement 410A.

In another example, the image 416A may depict the object being advertised in the 2D advertisement 410A in a given view (e.g., side view). The computing device may be configured to provide the 3D image 422 such that the object is initially shown with the given view in the 3D image viewer 420.

In an example, the 3D object data model represented by the 3D image 422 may be characterized based on parameters defining rendering features of pixels of the 3D image 422. The parameters may include, for example, a shading parameter characterizing a degree of shading associated with a given pixel and a material parameter characterizing a material type associated with the given pixel. The computing device may be configured to determine or identify the parameters from content (e.g., text and/or image) of the 2D advertisement 410A, for example. In the example, the computing device may be configured to render, in the 3D image viewer 420, the 3D image 422 representing the 3D object data model of the object based on the parameters.

In an example, the computing device may be configured to receive a 3D object data model file from a server. The 3D object data model file may include data to render the 3D image 422 of the object, or the 3D object data model file may be one of many files for the object (e.g., an object may be a mobile phone that has ten parts, and each part of the phone may be represented by a distinct file). The 3D object data model file may be an indexed file such that portions of image(s) represented by the file are labeled with a pointer to a shader or material that can be used to render an attribute of the object. As an example, for a mobile phone object, the mobile phone may have a rubber backing, a lens, a metal frame, etc., and each portion of the object may be represented by the file and indexed to an appropriate shader or material application.

The 3D image viewer 420 may be configured to provide a zooming tool 426 such that a user may be able to zoom in or out to focus on features or components of the object displayed in in the 3D image viewer 420. The 3D image viewer 420 also may be configured to provide a view change tool 428 that the user may be able to use to view different views (e.g., side views, top view, bottom view, etc.) of the object depicted in the 3D image 422. Other tools, capabilities, and functionalities may be possible.

Referring back to FIG. 3, at block 308, the method 300 includes providing, in the 3D image viewer, advertising information relating to the object and including at least a portion of the content of the 2D advertisement. For example, as shown in FIG. 4B, the computing device may be configured to provide in the 3D image viewer 420 an advertisement space 430. In an example, the computing device may be configured to provide in the advertisement space 430, advertising information 432 associated with the object depicted in the 3D image 422 (i.e., the object advertised in corresponding 2D advertisement 410A). The advertising information 432, for example, may include the text 414A and/or the image 416A included in the 2D advertisement 410A. In examples, the advertising information 432 may include additional advertising information including text, images, audio stream, and video feed that may not have been part of the content of the 2D advertisement 410A.

Figure 4C:
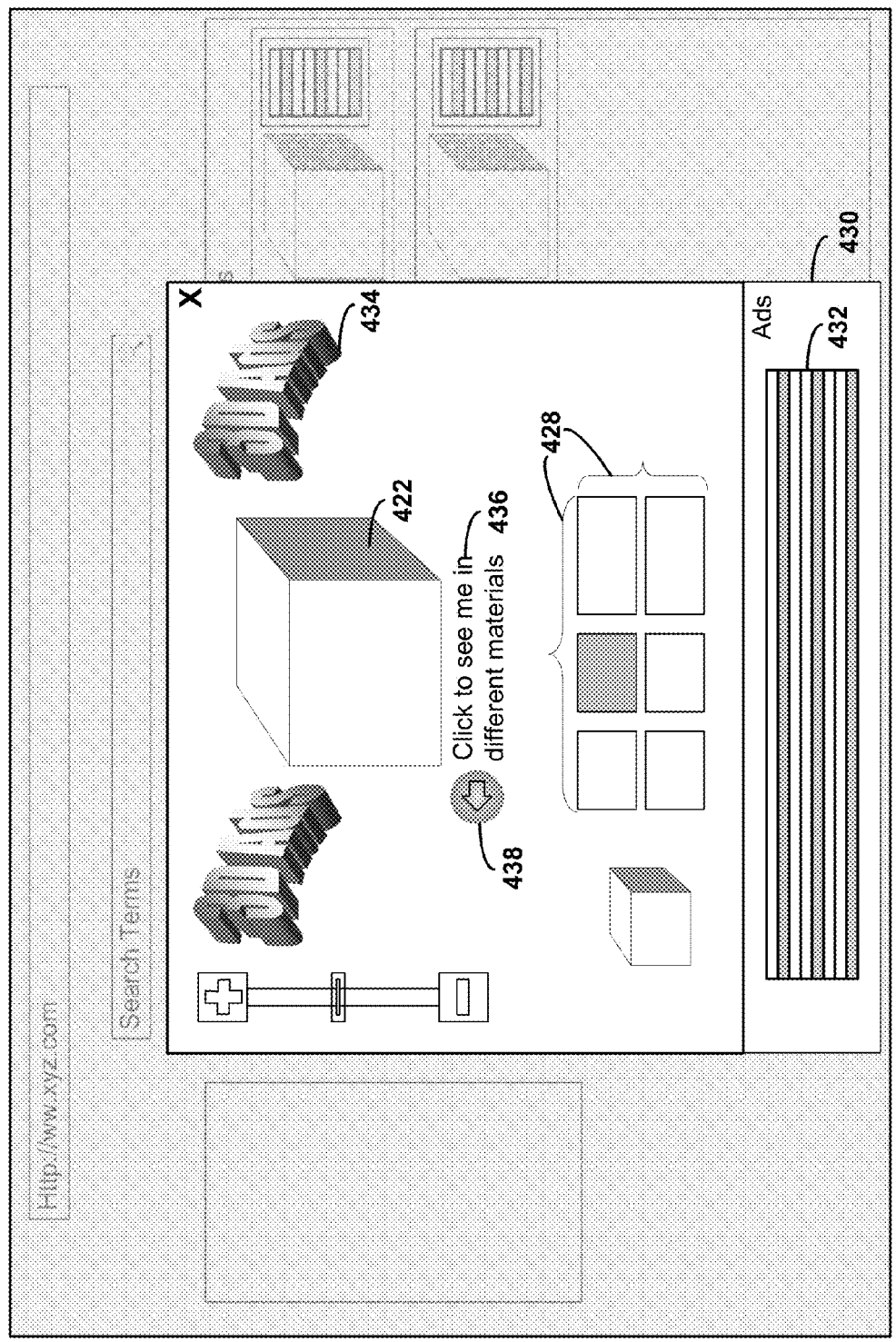
FIG. 4C illustrates example advertising information displayed in the example 3D image viewer, in accordance with an embodiment.

Additionally or alternately, the computing device may be configured to provide other forms of advertisements in the advertisement space 430 or in other areas in the 3D image viewer 420. FIG. 4C illustrates example advertising information displayed in the example 3D image viewer 420, in accordance with an embodiment. In addition to or alternate to providing the advertising information 432 in the advertising space 430 as 2D advertising information, the computing device may be configured to provide a 3D advertisement 434 as shown in FIG. 4C. The 3D advertisement 434 may be static or may be animated in the 3D image viewer 420. For example, the 3D advertisement 434 may be moving or changing positions with respect to the 3D image 422.

Additionally or alternately, the computing device may be configured to provide an interactive advertisement 436. As an example, the object advertised may be depicted in the 3D image 422 in a given material and the interactive advertisement 436 may allow the user to click on an icon 438 to view the object depicted in a different material, for example. This example is used for illustration only. Other interacting forms are possible.

In an example, the computing device may be configured to receive information indicative of a request to change a zoom level or view of the object in the 3D image viewer 420 by way of the zooming tool 426 or the view change tool 428, for example, and may be configured accordingly change position, content, or form of the advertising information (e.g., one or more of the advertising information 432, the 3D advertisements 434, and the interactive advertisement 436) provided in the 3D image viewer 420.

Figure 4D:
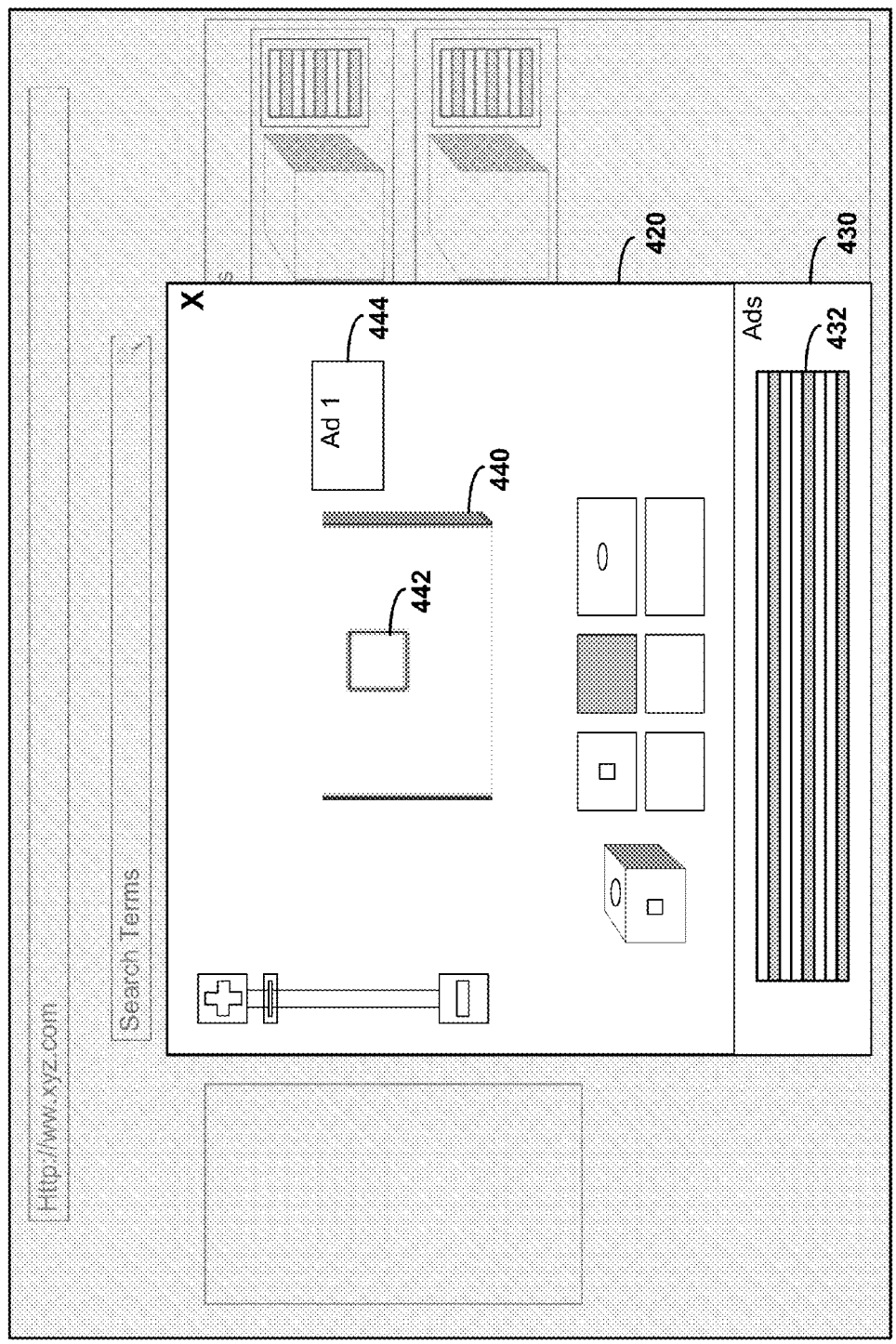
FIGS. 4D-4E illustrate an example of changing advertising information based on a change in view of an object in the example 3D image viewer, in accordance with an embodiment.
Figure 4E:
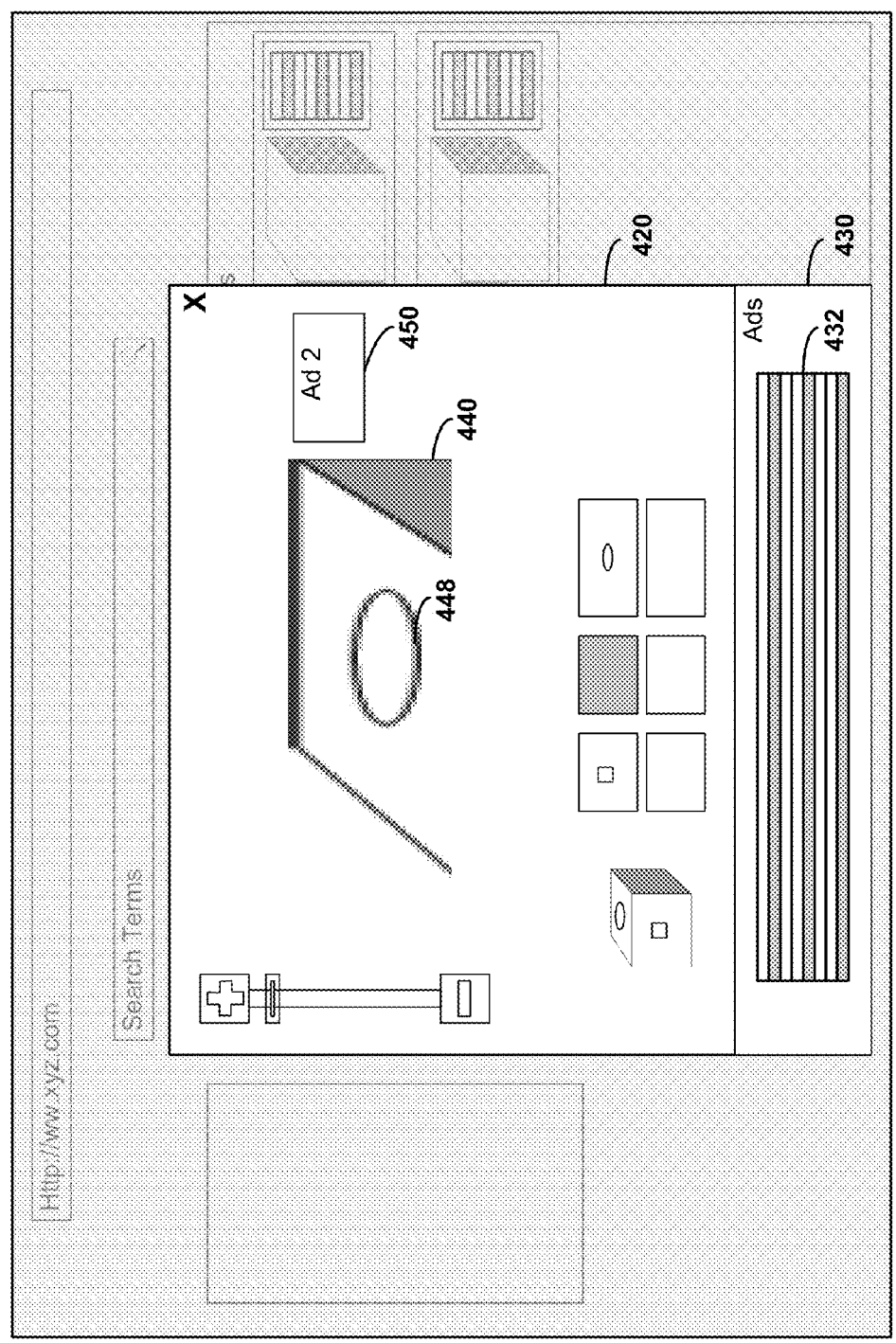

FIGS. 4D-4E illustrate an example of changing advertising information based on a change in view of an object in the example 3D image viewer, in accordance with an embodiment. FIG. 4D illustrates a 3D image 440 of an object that may be composed of multiple components. The computing device may have received information indicative of a request to provide a given view of the object and may have also received information indicative of a request to zoom on a component 442 of the multiple components. The computing device may be configured to provide a first advertisement 444 that may be directed to the component 442. As an example, the object 440 may be a car and the component 442 may be a tire. Accordingly, the computing device may be configured to provide the first advertisement 444 directed to a tire type, brand, or manufacturer, for example.

The computing device may further be configured to receive information indicative of a request to change a view of the object depicted in the 3D image 440 and zoom in on another component 448 of the multiple components as illustrated in FIG. 4E. The computing device may be configured to provide a second advertisement 450 directed to the component 448.

As described above, the 3D object data model represented by the 3D image (e.g., the 3D image 440) may be characterized based on parameters and attributes defining rendering features for the 3D image including shader and material. In an example, the computing device may be configured to provide the advertising information in the 3D image viewer (e.g., the 3D image viewer 420) based on the parameters or the attributes. As an example, the computing device may be configured to recognize that a material associated with a component of the object being advertised is rubber. Accordingly, the computing device may be configured to provide in the 3D image viewer advertising information relating to rubber products or manufacturers of rubber products.

Although the method 300 has been described in the context of advertisements for illustration, the method 300 can be used generally with any displayed content. For example, the computing device may be configured to determine, based on any two-dimensional (2D) content displayed on a display device, an object depicted in the 2D content. For instance, an article about famous buildings, displayed on a webpage, may include a picture of a building. The computing device may be configured to receive information indicative of a request to initiate a three-dimensional (3D) image viewer to view the building in the 3D image viewer. The computing device, accordingly, may be configured to provide information associated with instructions for rendering in the 3D image viewer a 3D image representing a 3D object data model of the building on the display device. The computing device may be configured to provide, in the 3D image viewer, information relating to the object information about history of the building, architectural characteristics of the building, etc. The information may include a portion of or comments from the article for example.

Figure 5:
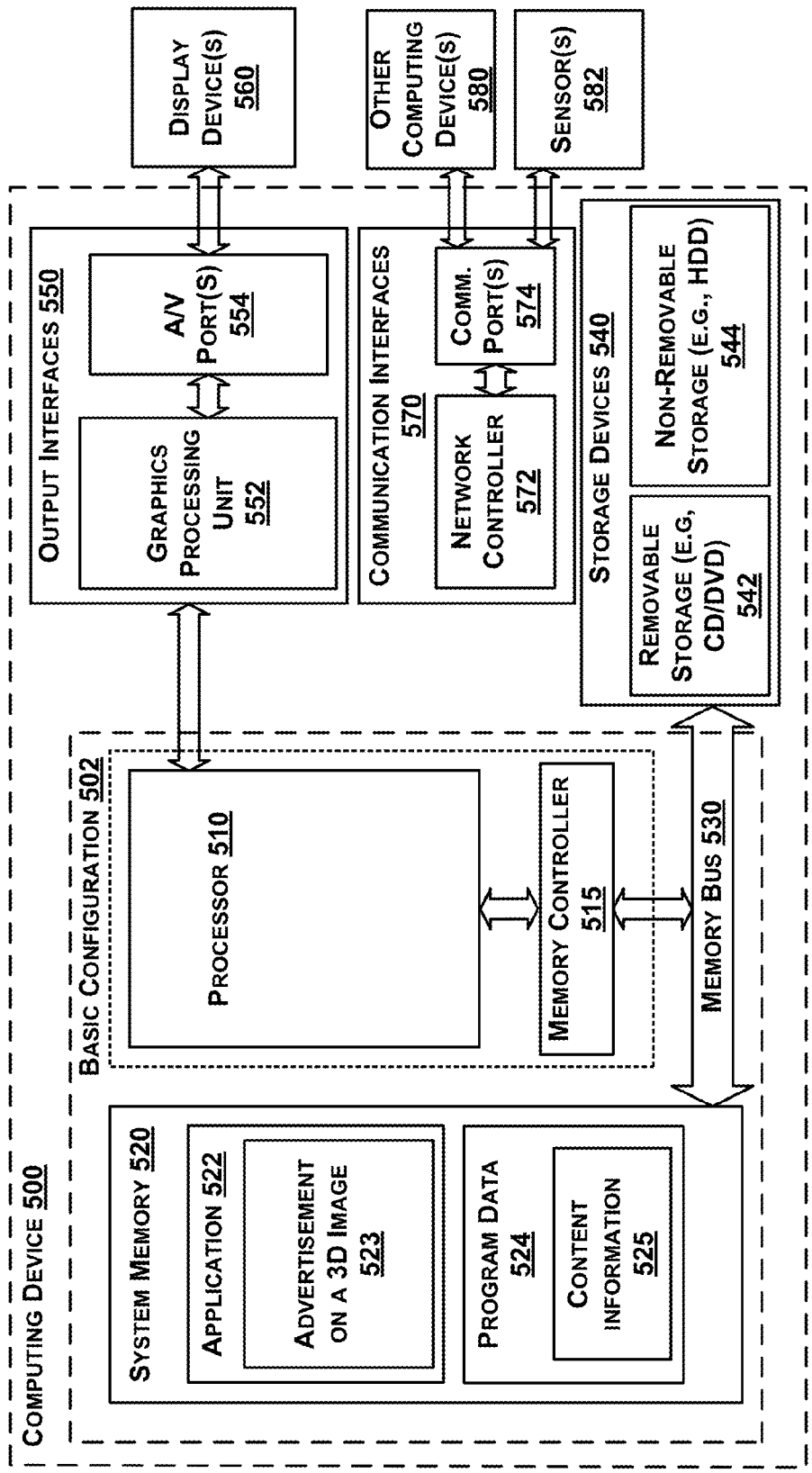
FIG. 5 is a functional block diagram illustrating an example computing device used in a computing system that is arranged in accordance with at least some embodiments described herein.

FIG. 5 is a functional block diagram illustrating an example computing device used in a computing system that is arranged in accordance with at least some embodiments described herein. The computing device may be a personal computer, mobile device, cellular phone, touch-sensitive wristwatch, tablet computer, video game system, or global positioning system, and may be implemented to provide a system for image marking and three-dimensional (3D) image generation system as described in FIGS. 1-4. The computing device 500 may, for example, be used to implement the method 300 illustrated in FIG. 3.

In a basic configuration 502, computing device 500 may typically include one or more processors 510 and system memory 520. A memory bus 530 can be used for communicating between the processor 510 and the system memory 520. Depending on the desired configuration, processor 510 can be of any type including but not limited to a microprocessor ($\mu P$), a microcontroller ($\mu C$), a digital signal processor (DSP), or any combination thereof. A memory controller 515 can also be used with the processor 510, or in some implementations, the memory controller 515 can be an internal part of the processor 510.

Depending on the desired configuration, the system memory 520 can be of any type including but not limited to volatile memory (such as RAM), non-volatile memory (such as ROM, flash memory, etc.) or any combination thereof. System memory 520 may include one or more applications 522, and program data 524. Application 522 may include advertisement on a 3D image algorithm 523 that is arranged to provide inputs to the electronic circuits, in accordance with the present disclosure. Program data 524 may include content information 525 that could be directed to any number of types of data. In some example embodiments, application 522 can be arranged to operate with program data 524 on an operating system.

Computing device 500 can have additional features or functionality, and additional interfaces to facilitate communications between the basic configuration 502 and any devices and interfaces. For example, data storage devices 540 can be provided including removable storage devices 542, non-removable storage devices 544, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Computer storage media can include volatile and nonvolatile, non-transitory, removable and non-removable media implemented in any method or technology for storage of information, such as computer readable instructions, data structures, program modules, or other data.

System memory 520 and storage devices 540 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing device 500. Any such computer storage media can be part of the computing device 500.

The computing device 500 can also include output interfaces 550 that may include a graphics processing unit 552, which can be configured to communicate to various external devices such as display devices 560 or speakers via one or more A/V ports 554 or a communication interface 570. The communication interface 570 may include a network controller 572, which can be arranged to facilitate communications with one or more other computing devices 580 and one or more sensors 582 over a network communication via one or more communication ports 574. The one or more sensors 582 are shown external to the computing device 500, but may also be internal to the device. The communication connection is one example of a communication media. Communication media may be embodied by computer readable instructions, data structures, program modules, or other data in a modulated data signal, such as a carrier wave or other transport mechanism, and includes any information delivery media. A modulated data signal can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media.

In some embodiments, the disclosed methods may be implemented as computer program instructions encoded on a non-transitory computer-readable storage media in a machine-readable format, or on other non-transitory media or articles of manufacture. FIG. 6 is a schematic illustrating a conceptual partial view of an example computer program product that includes a computer program for executing a computer process on a computing device, arranged according to at least some embodiments presented herein.

In one embodiment, the example computer program product 600 is provided using a signal bearing medium 601. The signal bearing medium 601 may include one or more programming instructions 602 that, when executed by one or more processors may provide functionality or portions of the functionality described above with respect to FIGS. 1-5. In some examples, the signal bearing medium 601 may encompass a computer-readable medium 603, such as, but not limited to, a hard disk drive, a Compact Disc (CD), a Digital Video Disk (DVD), a digital tape, memory, etc. In some implementations, the signal bearing medium 601 may encompass a computer recordable medium 604, such as, but not limited to, memory, read/write (R/W) CDs, R/W DVDs, etc. In some implementations, the signal bearing medium 601 may encompass a communications medium 605, such as, but not limited to, a digital and/or an analog communication medium (e.g., a fiber optic cable, a waveguide, a wired communications link, a wireless communication link, etc.). Thus, for example, the signal bearing medium 601 may be conveyed by a wireless form of the communications medium 605 (e.g., a wireless communications medium conforming to the IEEE 802.11 standard or other transmission protocol).

The one or more programming instructions 602 may be, for example, computer executable and/or logic implemented instructions. In some examples, a computing device such as the computing device 500 of FIG. 5 may be configured to provide various operations, functions, or actions in response to the programming instructions 602 conveyed to the computing device 500 by one or more of the computer readable medium 603, the computer recordable medium 604, and/or the communications medium 605.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method, comprising:
    providing a webpage, wherein the webpage includes search results generated in response to a search query, a two-dimensional (2D) advertisement generated in response to the search query and associated with the search results, and a three-dimensional (3D) image viewer embedded in the webpage;
    determining, based on content of the 2D advertisement, an object being advertised in the 2D advertisement, wherein the content of the 2D advertisement includes a 3D image of the object, and wherein the object comprises one or more components;
    receiving information indicative of a request to initiate the 3D image viewer to view the content of the 2D advertisement in the 3D image viewer, wherein the 3D image viewer is configured to render a 3D object data model that represents the 3D image of the object being advertised in the 2D advertisement;
    determining one or more attributes of the object including at least one color of the object, at least one material that the object is made of, size of the object, position of the object in the 2D advertisement, and a view of the object as advertised in the 2D advertisement;
    providing, based on the information indicative of the request and the one or more attributes, rendering information associated with instructions for rendering the 3D object data model in the 3D image viewer according to the one or more attributes;
    providing, in the 3D image viewer, the 3D object data model rendered in the 3D image viewer, and the content of the 2D advertisement generated in response to the search query;
    receiving information indicative of a request to select, in the 3D image viewer, a component of the one or more components;
    based on the request to select the component, determining one or more 2D advertisements associated with the component; and
    providing, in the 3D image viewer, the one or more 2D advertisements associated with the component.

2. The method of claim 1, further comprising providing respective instructions to generate a display of the 2D advertisement.

3. The method of claim 2, wherein receiving the information indicative of the request to initiate the 3D image viewer comprises receiving a selection of the 2D advertisement displayed.

4. The method of claim 1, wherein the 2D advertisement includes one or more of (i) a pop-up advertisement, (ii) a pop-under advertisement, (iii) an audio stream, and (iv) a video feed.

5. The method of claim 1, wherein the 3D object data model is characterized based on parameters defining rendering features of pixels of the 3D image, wherein the parameters include one or more of (i) a shading parameter characterizing a degree of shading associated with a given pixel, and (ii) a material parameter characterizing a material type associated with the given pixel.

6. The method of claim 5, further comprising causing the 3D object data model of the 3D image to be rendered based on the parameters.

7. The method of claim 5, further comprising determining one or more of the parameters and one or more of the attributes based on the one or more keywords included in the content of the 2D advertisement.

8. The method of claim 5, further comprising determining one or more of the parameters and one or more of the attributes, by way of image recognition, based on given content of the 3D image included in the content of the 2D advertisement.

9. The method of claim 5, wherein providing the content of the 2D advertisement comprises providing the content based on one or more of the parameters and one or more of the attributes.

10. The method of claim 1, further comprising causing the 3D image viewer to be initiated in a pop-up window, based on the information indicative of the request to initiate the 3D image viewer.

11. The method of claim 10, wherein the pop-up window overlays the webpage, and wherein a semi-transparent graphic is overlaid onto the contents of the webpage.

12. The method of claim 1, wherein providing the content of the 2D advertisement in the 3D image viewer comprises providing an animated advertisement in the 3D image viewer.

13. The method of claim 1, wherein providing the content of the 2D advertisement comprises providing one or more of a text, an audio stream, and a video feed relating to the object.

14. The method of claim 1, wherein the 3D image viewer is configured to receive an input, wherein the input includes one or more of a request to zoom in on the 3D object data model, a request to provide a second view of the 3D image, and a request to rotate the 3D object data model.

15. The method of claim 1, wherein receiving information indicative of the request to select the component of the one or more components comprises receiving information indicative of a request relating to zooming, in the 3D image viewer, on the component of the one or more components.

16. A non-transitory computer readable medium having stored thereon instructions executable by a computing device to cause the computing device to perform functions comprising:
provide a webpage, wherein the webpage includes search results generated in response to a search query, a two-dimensional (2D) advertisement generated in response to the search query and associated with the search results, and a three-dimensional (3D) image viewer embedded in the webpage;
determining, based on content of the 2D advertisement, an object being advertised in the 2D advertisement, wherein the content of the 2D advertisement includes a 3D image of the object, and wherein the object comprises one or more components;
receiving information indicative of a request to initiate the 3D image viewer to view the content of the 2D advertisement in the 3D image viewer, wherein the 3D image viewer is configured to render a 3D object data model that represents the 3D image of the object being advertised in the 2D advertisement;
determining one or more attributes of the object including at least one color of the object, at least one material that the object is made of, size of the object, position of the object in the 2D advertisement, and a view of the object as advertised in the 2D advertisement;
providing, based on the information indicative of the request and the one or more attributes, rendering information associated with instructions for rendering the 3D object data model in the 3D image viewer according to the one or more attributes;
providing, in the 3D image viewer, the 3D object data model rendered in the 3D image viewer, and the content of the 2D advertisement generated in response to the search query;
receiving information indicative of a request to select, in the 3D image viewer, a component of the one or more components;
based on the request to select the component, determining one or more 2D advertisements associated with the component; and
providing, in the 3D image viewer, the one or more 2D advertisements associated with the component.

17. The non-transitory computer readable medium of claim 16, further comprising instructions executable by the computing device to cause the computing device to perform functions comprising:
receiving information indicative of a given request to change a view of the 3D object data model in the 3D image viewer; and
changing the content of the 2D advertisement, based on the change in the view of the 3D object data model in the 3D image viewer.

18. The non-transitory computer readable medium of claim 16, wherein the function of providing, in the 3D image viewer, the content of the 2D advertisement relating to the object comprises providing an interactive advertisement associated with the object.

19. A system, comprising:
a computing device; and
a memory, the memory storing instructions executable by the computing device to cause the computing device to:
provide a webpage, wherein the webpage includes search results generated in response to a search query, a two-dimensional (2D) advertisement generated in response to the search query and associated with the search results, and a three-dimensional (3D) image viewer embedded in the webpage;
determine, based on content of the 2D advertisement, an object being advertised in the 2D advertisement, wherein the content of the 2D advertisement includes a 3D image of the object, and wherein the object comprises one or more components;
receive information indicative of a request to initiate the 3D image viewer to view the content of the 2D advertisement in the 3D image viewer, wherein the 3D image viewer is configured to render a 3D object data model that represents the 3D image of the object being advertised in the 2D advertisement;
determine one or more attributes of the object including at least one color of the object, at least one material that the object is made of, size of the object, position of the object in the 2D advertisement, and a view of the object as advertised in the 2D advertisement;
provide, based on the information indicative of the request and the one or more attributes, rendering information associated with instructions for rendering the 3D object data model in the 3D image viewer according to the one or more attributes;
provide, in the 3D image viewer, the 3D object data model rendered in the 3D image viewer, and the content of the 2D advertisement generated in response to the search query;
receive information indicative of a request to select, in the 3D image viewer, a component of the one or more components;
based on the request to select the component, determine one or more 2D advertisements associated with the component; and
provide, in the 3D image viewer, the one or more 2D advertisements associated with the component.

20. The system of claim 19, wherein the instructions are further executable by the computing device to cause the computing device to provide a user-selectable space in the 2D content, wherein the computing device is configured to receive the information indicative of request to initiate the 3D image viewer in response to a selection of the user-selectable space.

* * * * *